(12) United States Patent
Matsuda

(10) Patent No.: US 6,468,423 B1
(45) Date of Patent: Oct. 22, 2002

(54) ELECTROMAGNETIC WATER TREATMENT APPARATUS

(75) Inventor: Shoichi Matsuda, Tokyo (JP)

(73) Assignee: The Japan Steel Works, Ltd., Tokyo (JP)

( * ) Notice: Subject to any disclaimer, the term of this patent is extended or adjusted under 35 U.S.C. 154(b) by 87 days.

(21) Appl. No.: 09/698,202

(22) Filed: Oct. 30, 2000

(30) Foreign Application Priority Data

Oct. 29, 1999 (JP) ............................................ 11-308430

(51) Int. Cl.7 .................................................. C02F 1/48
(52) U.S. Cl. ........................ 210/222; 210/243; 204/664; 204/666
(58) Field of Search ................................ 210/222, 223, 210/695, 243, 748; 204/660, 664, 666, 554

(56) References Cited

U.S. PATENT DOCUMENTS 5,645,716 A * 7/1997 Izaguirre-Martinez et al. ... 210/243
6,203,710 B1 * 3/2001 Woodbridge ................. 210/223

FOREIGN PATENT DOCUMENTS

| JP | 5-7286 | * | 3/1993 |
| JP | 02-555235 A | | 8/1996 |

OTHER PUBLICATIONS

Translation of JP 5–7286, which was published on Mar. 1993.*

* cited by examiner

Primary Examiner—David A. Reifsnyder
(74) Attorney, Agent, or Firm—Sughrue Mion, PLLC

(57) ABSTRACT

Magnetic field generation device 5a and 5b, for applying a magnetic field to water, are located in the vicinity of an inlet 7 or an outlet 8 in a water passage area wherein pairs of electrodes 11 and 12 are arranged with intervening gaps. In the water passage area wherein the electrodes 11 and 12 are disposed, passage walls 10, which are arranged at predetermined intervals and which are perpendicular to the axial direction of a pipe line 2, define water passages, and, with the internal surface of the pipe line 2, openings 10a and 10b. The electrodes 11 and 12 are mounted on the faces of the passage walls 10.

19 Claims, 3 Drawing Sheets

ELECTROMAGNETIC WATER TREATMENT APPARATUS

BACKGROUND OF INVENTION

1. Field of Invention

The present invention relates to an electromagnetic water treatment apparatus for preventing the occurrence and the attachment of scale or rust along a channel used for the circulation of water, and relates in particular to a water treatment apparatus appropriate for an application that can be used for the treatment of a large volume of water.

2. Related Art

Conventionally, an electromagnetic water treatment apparatus, which applies to water an electric field and a magnetic field to prevent the occurrence and attachment of scale and rust along a channel used for the circulation of water, has been proposed (Japanese Patent No. 2,555,235) and is presently being practically employed.

As is shown in FIG. 5, the presently available electromagnetic water treatment apparatus is so designed that a pair of permanent magnets 31 and 32 and a pair of electrodes 33 and 34, composed of different metals, are attached to a casing 35, and along with the casing 35, collectively define a water passage 30.

According to the principle incorporated into this apparatus, a magnetic field, which is generated by the permanent magnets 31 and 32, and an electric field, which is generated by a weak current that is fed to the electrodes 33 and 34, are applied to water flowing through the water passage 30, which is defined by the casing 35 and the permanent magnets 31 and 32. And as a result, the occurrence and attachment of scale and rust can be effectively prevented.

Originally, the objective of the conventional water treatment apparatus was the treatment of water passing through common cooling towers. However, a need has also been expressed for an electromagnetic water treatment apparatus that can be used to treat water circulating through large factory cooling towers, such as those used for petrochemical or petroleum refineries, and that can effectively prevent the occurrence of scale and rust in such constructs.

Since some of the large cooling towers hold around 1000 tons of water, to obtain the same effects as those provided for smaller conventional installations, an arrangement must be provided that can facilitate the effective application of an electric field and a magnetic field to large volumes of water. However, the sizes of the electrodes that can be employed for the conventional electromagnetic water treatment apparatus are limited due to the size of the apparatus itself, and it would therefore be difficult to use the conventional water treatment apparatus to effectively apply an electric field to a large volume of water. Further, were an arrangement employing large electrodes to be used, a huge electromagnetic water treatment apparatus would be required, and spatially this is not realistic.

SUMMARY OF INVENTION

To resolve this problem, it is one objective of the present invention to provide an electromagnetic water treatment apparatus that can treat a large volume of water, without the size of the apparatus having to be increased.

To achieve this objective, according to a first aspect of the present invention, an electromagnetic water treatment apparatus comprises:

a pair or pairs of electrodes, which are separated by intervening gaps and are disposed along and individually face water passages, that apply electric fields to water flowing through the water passages; and magnetic field generation means, so arranged that a magnetic field is applied to the water flowing through the water passages, wherein the magnetic generation means is located in the vicinity of either a water outlet or an inlet or both in an area or in areas wherein the electrodes are disposed along the water passages.

According to a second aspect of the invention, for the electromagnetic water treatment apparatus of the first aspect, the pair or pairs of electrodes are constructed of materials having different electrochemical potentials.

According to a third aspect of the invention, for the electromagnetic water treatment apparatus of the first or the second aspect, the water passages, along which the electrodes are disposed, are provided in a pipe line in which the water passages are defined by passage walls, positioned at predetermined intervals, that perpendicularly staggered the axial direction of the flow of water through the pipe line and hinder the free movement of water except at openings at the ends of the passage walls. The electrodes are mounted on the facing surfaces of the passage walls and the location of the openings differ for adjacent passage walls.

According to a fourth aspect of the invention, for the electromagnetic water treatment apparatus of the third aspect, the openings are formed at alternate ends of adjacent passage walls between the ends of the passage walls and the inner surface of the pipe line, and are located, for individual adjacent passage walls, at alternate, opposite positions relative to the axis of the pipe line.

According to the electromagnetic water treatment of this invention, the magnetic field generation means that generates a magnetic field is located in the vicinity of the electrodes and is separated by a slight distance from the locations whereat the electrodes are mounted. Therefore, restrictions imposed on the arrangement of the electrodes are reduced, and an electrode arrangement method can be easily adopted that can effectively attain a specific objective, such as an increase in the electrode area, as in the third aspect. Furthermore, since the restrictions placed on the shape of a water treatment apparatus have also been reduced, it is possible to prevent the installation of the electromagnetic water treatment apparatus from becoming difficult due to restrictions that are placed on the shape of the water channel.

It should be noted that, in accordance with the arrangement of the invention, unlike the conventional apparatus, an electric field and a magnetic field are not applied to common space; however, since these fields can be applied to water treated in common over a very short distance, the same effects can be acquired as are obtained by applying the electric field and the magnetic field to common space.

According to the invention, preferably, the electrodes are composed of different types of conductive materials that, because of their differing electrochemical potentials, are relatively negative and positive. At this time, no limitations are placed on the materials and the material combinations that can be used. For example, Al, Zn, Pb or Mg can be used for negative electrodes, and carbon, Pt, stainless steel or Ti can be used for positive electrodes. When a pair of electrodes such as these is disposed along a water passage, and the electrodes are connected electrically, a current will flow across the gap between the electrodes, and an electric field will be applied to the water flowing through the water passage. It should be noted that the electrodes may be connected directly or via a resistor, and that when a resistor is employed, the strength of the electric field applied to the water can be adjusted by changing the resistance of the resistor.

An electric field may also be generated by using a battery to apply a potential to the electrodes, and in this case, the electrodes need not always be formed of different types of materials having different electrochemical potentials.

In actuality, any type of electrodes can be employed, just so long as they are arranged facing a water passage and can apply an electric field to water flowing through the passage. Further, the shapes of the electrodes and the sizes of the gaps between them, and the number of electrodes that can be used and their locations are not specifically controlled. It must be understood, however, that to obtain the large electrode area that is required when a large volume of water is to be treated, it is preferable, as in the third aspect, that a plurality of passage walls be employed that are arranged so that they stagger and are perpendicular to the axial direction of the pipe line and the direction of movement of the water, and that the electrodes be arranged along these passage walls. The movement of water through the pipe line, which is hindered by the passage walls, is facilitated by partial openings that are formed to permit the water to flow through the pipe line.

With this arrangement, the water passages along which the electrodes can be disposed are considerably extended, without increasing the size of the apparatus, and accordingly, there is a corresponding increase in the area occupied by the electrodes arranged along the water passages. At this time, since the water winds between the passage walls and through the alternately positioned openings between the passage walls and the interior wall of the pipe line (relative to the axial direction of the water flow through the pipe line), the electric fields that are generated by the electrodes mounted on the passage walls can be effectively applied to the water. And when, for individual adjacent passage walls, the openings are alternately located at opposite positions relative to the axis of the pipe line, substantially, the water will flow along all the electrodes. Thus, it is even more ensured that an electric field will be effectively applied to the water.

The water passages are normally provided in the pipe line. And in order to apply the magnetic field to the water, the magnetic field generation means is located in the vicinity of at least either the outlet or the inlet for the water passages along which the electrodes are arranged. When the magnetic field generation means is located at least one place regardless of the outlet or the inlet, the effects, including a synergistic effect, of the magnetic field and the electric fields generated by the electrodes can be provided for the water. In order to more precisely provide a synergistic effect for the magnetic field and the electric field, it is preferable that magnetic field generation means be positioned at both the water outlet and inlet. In this case, the vicinity of the outlet or the inlet generally means the external area adjacent to the outlet or the inlet, because the external portion is less affected by the arrangement of the electrodes.

The magnetic field generation means can be provided by arranging magnets so the a magnetic field is applied to the water passages. The magnets that are used may be either permanent magnets or solenoids, but generally, permanent magnets are employed for which the application of electricity is not required.

The magnets, in this case, are so arranged the faces of opposed magnets that generate a magnetic field have different polarities. However, the same polarity may be used for opposing faces, and depending on the arrangement that is employed, the magnetic faces may not be even be located opposite each other.

DETAILED DESCRIPTION OF PREFERRED EMBODIMENTS

Figure 1:
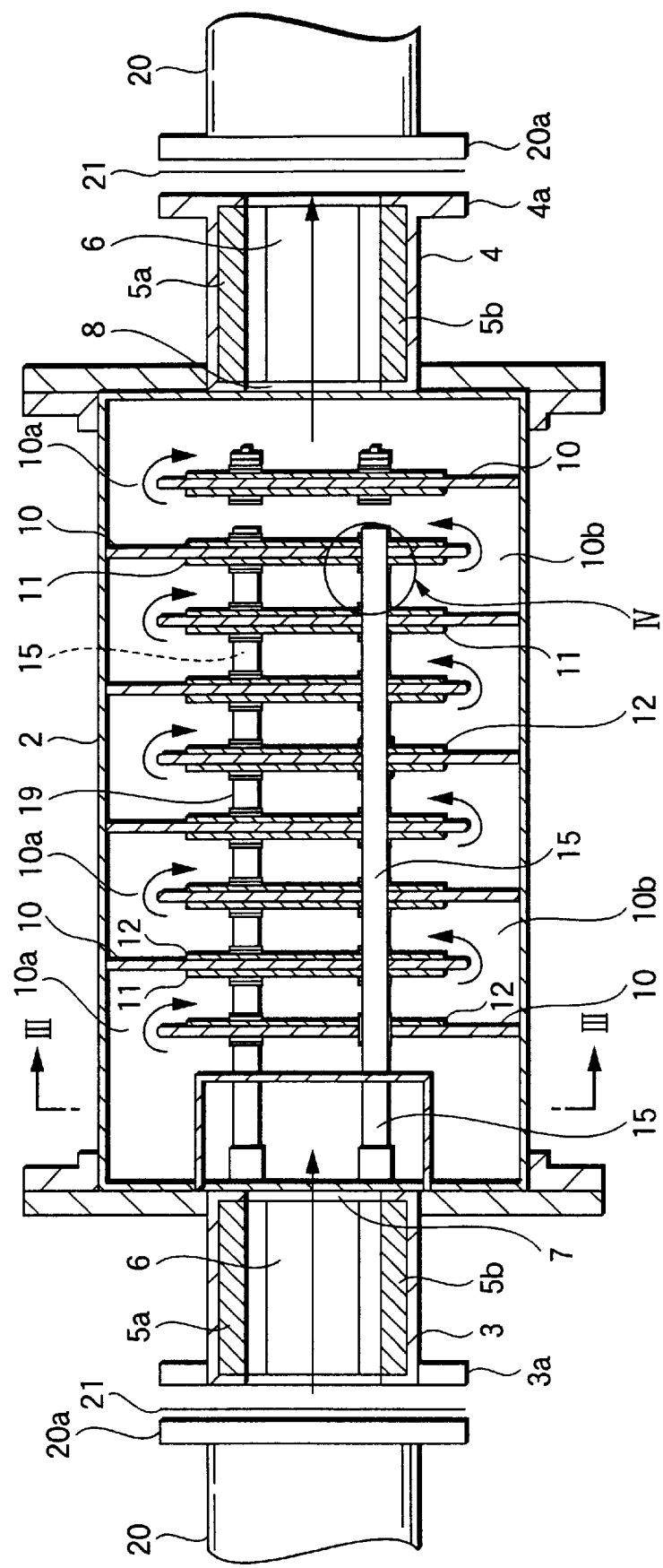
FIG. 1 is a cross-sectional plan view of one embodiment of the invention.
Figure 2:
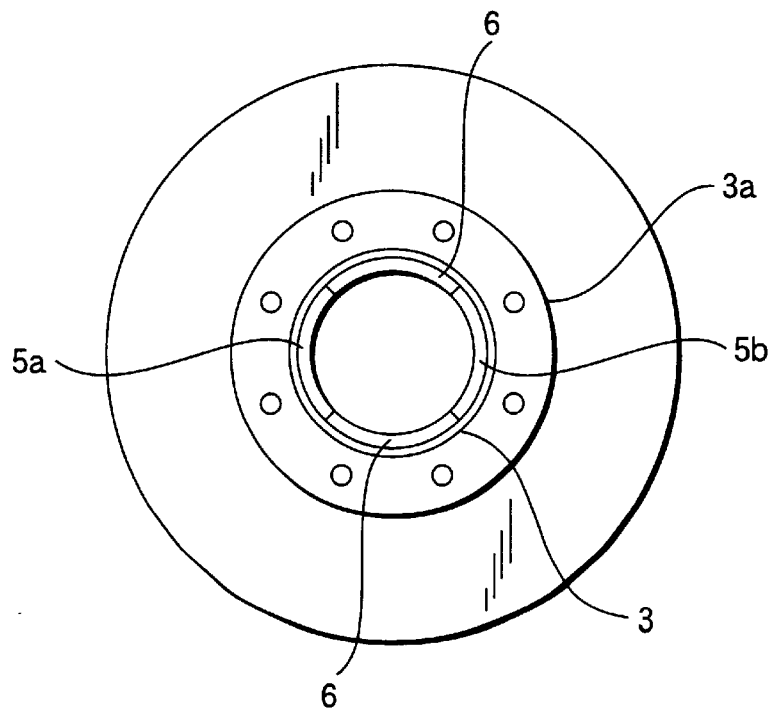
FIG. 2 is a side view of the embodiment.
Figure 3:
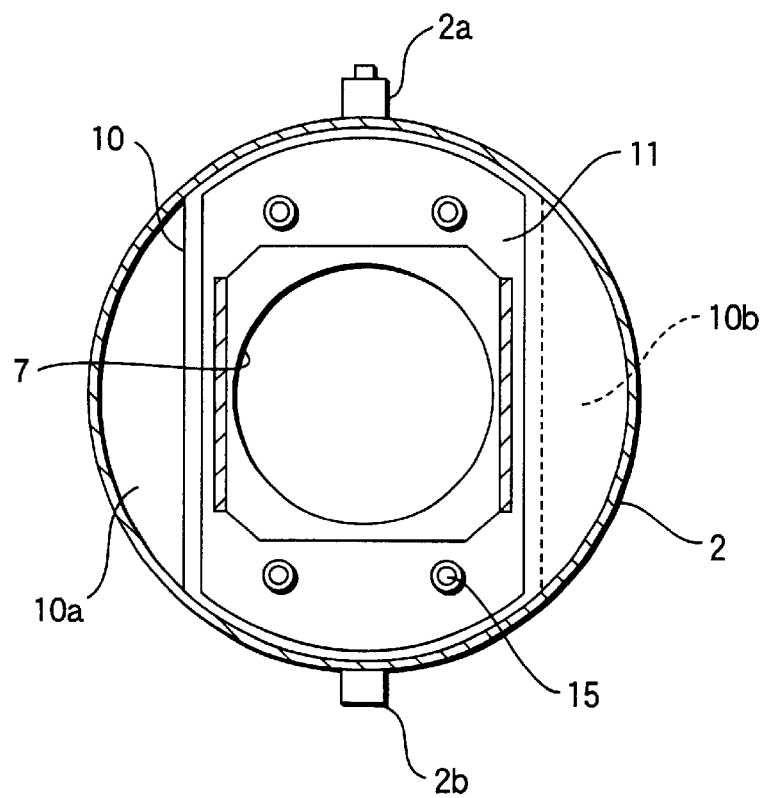
FIG. 3 is a cross-sectional view taken along line III—III in FIG. 1.

One embodiment of the present invention will now be described while referring to FIGS. 1 to 4.

For an electromagnetic water treatment apparatus 1, an input connection cylinder 3 and an output connection cylinder 4 are provided at the ends of a pipe line 2, and the apparatus is installed between a water feed line and the water channel of a water circulating system, such as a large cooling tower.

For the input connection cylinder 3 and the output connection cylinder 4, permanent magnets 5a and 5b are arranged with different poles facing each other, thus enabling a magnetic field to be applied to the water passage in each connection cylinder 3 or 4. Insulating spacers 6 are inserted between the permanent magnets 5a and 5b, and connection flanges 3a and 4a are formed for the connection of the cylinders 3 and 4. The flanges 3a and 4a are connected via packing disks 21 to the end flanges 20a of water channels 20 that are connected to the electromagnetic water treatment apparatus 1.

The pipe line 2 communicates with the cylinders 3 and 4 via through holes 7 and 8, which correspond to the inlet and the outlet of the pipe line 2. An air vent pipe 2a is formed on the top of the pipe line 2, and a drain 2b is formed on the bottom of the pipe line 2.

Furthermore, inside the pipe line 2, a plurality of passage walls 10, which have plate shapes and are positioned at predetermined intervals so as to stagger the axial direction of the pipe line 2, block the pipe line 2 except for openings 10a and 10b that they define. The openings 10a and 10b are bow-shaped through holes that are alternately formed at the right and the left ends of the individual passage walls 10.

For each of the passage walls 10, an adhesive is used to secure an Al electrode 11 to one side face (to the left in FIG. 1), and to secure a carbon electrode 12 to the other side face (to the right in FIG. 1) (except for the wall side faces nearest the inlet and the outlet). Each of the facing Al electrodes 11 and carbon electrodes 12 are electrically connected.

Figure 4:
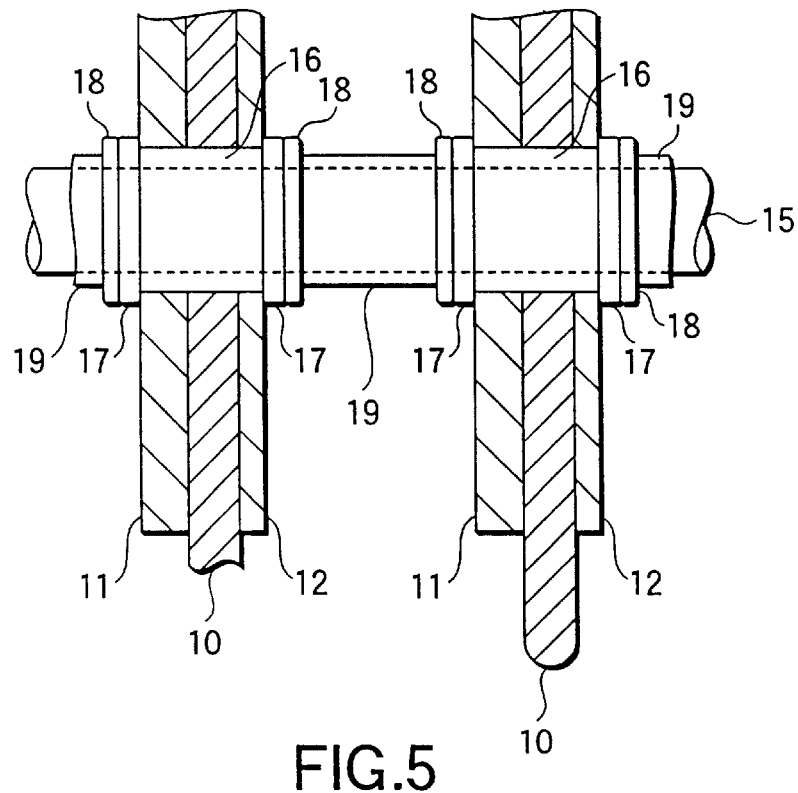
FIG. 4 is an enlarged diagram of a portion indicated by an arrow IV in FIG. 1.
Figure 5:
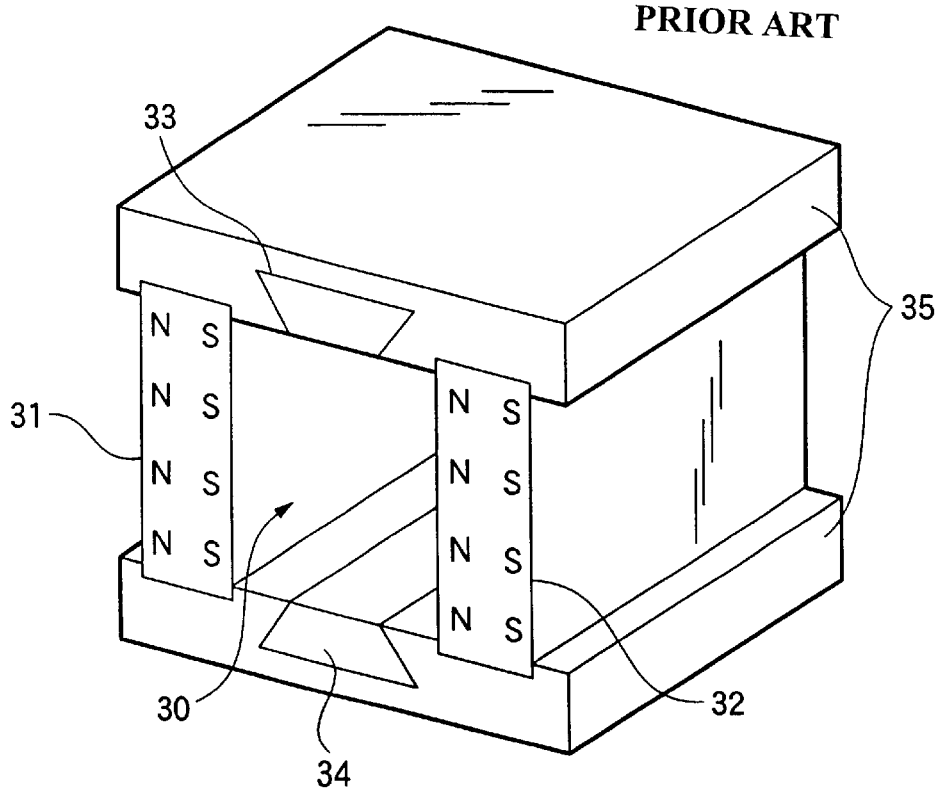
FIG. 5 is a perspective view of a conventional electromagnetic water treatment apparatus.

Four fixing bars 15, each of which has one end secured to an end wall of the pipe line 2, are so arranged in the pipe line 2, that they pass through each of the passage walls 10. As is shown in FIG. 4, insulating cylindrical spacers 16 are fitted around the fixing bars 15 between the fixing bars 15 and the through holes in the passage walls 10, the Al electrodes 11 and the carbon electrodes 12. Also, an insulating washer 17 is fitted around the fixing bars 15 at either end of each of the insulating spacers 16. The washers 17 contact the surfaces of the Al electrodes 11 and the surfaces of the carbon electrodes 12, and prevent the electrical connection of the individual electrodes connected by the fixing bars 15. In addition, washers 18 are fitted over the fixing bars 15, where they contact the insulating washers 17, and spacers 19 are fitted over the fixing bars 15 between the washers 18. These washers 18 and the spacers 19 are not necessarily insulating.

For the water treatment process, the electromagnetic water treatment apparatus 1 is connected and fixed to the water channels 20 via the input connection cylinder 3 and the output connection cylinder 4. When water to be treated flows along the water channel 20, the water first enters the input connection cylinder 3 of the electromagnetic apparatus connected thereto. There, the magnetic force field produced by the permanent magnets 5a and 5b, which are arranged in the input connection cylinder 3, is exerted in the water, and thereafter, the magnetic field is applied to the scale carried by the water and a Lorentz electric field, generated by the magnetic force, acts on the scale.

As the water continues to flow, the scale to which the magnetic force and the electric field have been applied enters the pipe line 2, from the input connection cylinder 3, via the through hole 7. Then, the scale is carried through the water passages, alternately passing between the passage walls 10 and through the openings 10a and 10b, so that the scale is carried along the pipe line 2 to the right in FIG. 1. During this movement, except when the water passes through the openings 10a and 10b, the water is travelling between the Al electrodes 11 and the carbon electrodes 12 that stagger the pipe line 2. The Al electrodes 11 and the carbon electrodes 12 are electrically connected to the exterior, and the electric field is generated via the water because the electrochemical potentials differ. Therefore, the electric field is applied by the electrodes to the scale that is carried with the water. Immediately before this application, the magnets 5a and 5b, which serve as the magnetic field generation means, apply the magnetic field and the Lorentz field to the scale, and substantially, the scale is in a state wherein these fields are synergistically applied. Further, the water that has wound through the pipeline 2 is thereafter discharged from the pipe line 2 via the through hole 8 to the output connection cylinder 4. In the cylinder 4 as well as in the cylinder 3, magnetic force is applied to the water by the permanent magnets 5a and 5b, and the magnetic force and the Lorentz electric field are applied to the scale contained in the water. The scale is thereafter discharged with the water from the cylinder 4, and is flows into the water channel 20. That is, as is described above, the magnetic field and the Lorentz electric field, the electric field generated by the electrodes, and the magnetic field and the Lorentz electric field are applied to the scale contained in the water, and these forces are exerted on the scale independently and synergistically. As a result, the scale elements, such as calcium, magnesium and silica, are disassociated while floating in the water as the nucleuses of crystals, and gradually coagulate in the water channel 20 and change to sludge. The sludge can then be collected and removed from the water channel 20.

According to the electromagnetic water treatment apparatus, compared with when electrodes are arranged along a pipe line, an electrode area can be considerably extended, without the size of the water treatment apparatus having to be increased. Further, the occurrence of scale and rust and their attachment to the interior of the water channel can be effectively prevented, even when a large volume of water is to be treated.

In this embodiment, the magnetic field generation means is provided at both ends of the pipe line; however, for this invention, the magnetic field generation means need, at the least, be arranged at only one end of the pipe line.

Although in the embodiment the water channel system is employed for the treatment of large volumes of water, the treatment process can also be applied for small volumes of water. Further, the invention can also be applied by calculating the degree of freedom afforded by the electrode arrangement.

As is described above, according to the electromagnetic water treatment apparatus of this invention, the magnetic field generation means is located in the vicinity of either or both the outlet and the inlet for the water passage area wherein the electrodes are arranged. Thus, the same effects can be acquired as are obtained when an electric field and a magnetic field are applied in a space used in common. Further, since due to the magnetic field generation means there are little or no restrictions placed on the arrangement of the electrodes, the degree of freedom permitted for the arrangement of the electrodes can be increased. Therefore, when the passage walls are arranged at predetermined intervals so that they stagger and are perpendicular to the axial direction of the pipe line and define water passages between them, and when the passage walls hinder the movement of water through the pipe line except at the partial openings, since the electrodes are arranged along the passage walls, the electrode area can be considerably extended, without the size of the electromagnetic water treatment apparatus having to be increased. Further, the water treatment provided for a large volume of water, such as is contained in a large cooling tower constructed for a petrochemical or a petroleum refinery, can be efficiently performed.

What is claimed is:

1. An electromagnetic water treatment apparatus comprising:
    a pair or pairs of electrodes facing water passages through a predetermined gap to apply electric fields to water flowing through said passages; and
    magnetic field generation means for applying a magnetic field to said water passing through said water passages, said magnetic field generation means located in a vicinity of at least one of a water outlet and a water inlet in an area where said electrodes are disposed along said water passages,
    wherein said electrodes are disposed at a non-parallel angle to a flow of water entering said apparatus at said water inlet such that said electrodes impede the flow of water through said apparatus.

2. An electromagnetic water treatment apparatus according to claim 1, wherein said electrodes are different in materials having different electrochemical potentials.

3. An electromagnetic water treatment apparatus according to claim 1, wherein said electrodes are connected by a controller that controls said electric fields.

4. An electromagnetic water treatment apparatus according to claim 1, wherein said water passages are provided in a pipe line at predetermined intervals, and
    wherein said water passages are perpendicularly staggered along a longitudinal axial direction of the pipe line.

5. An electromagnetic water treatment apparatus according to claim 4, wherein said water passages respectively have inlet openings into which water flows into said water passages and respectively have outlet openings into which water flows out of said water passages,
    wherein said inlet openings of alternate ones of said water passages are disposed on opposite sides of a longitudinal axis of said pipe line, and wherein said longitudinal axis is aligned in said longitudinal axial direction.

6. An electromagnetic water treatment apparatus according to claim 1, wherein a battery applies a potential to said electrodes.

7. An electromagnetic water treatment apparatus, comprising:
   a pair or pairs of electrodes facing water passages through a predetermined gap to apply electric fields to water flowing through said passages; and
   magnetic field generation means for applying a magnetic field to said water passing through said water passages, said magnetic field generation means located in a vicinity of at least one of a water outlet and a water inlet in an area where said electrodes are disposed along said water passages,
   wherein said water passages, along which said electrodes are disposed, are provided in a pipe line, said water passages are defined by passage walls with openings for allowing free movement of water in such a manner that said water passages are positioned at predetermined intervals, perpendicularly staggered along a longitudinal axial direction of the pipe line, and said electrodes are arranged on facing surfaces of said passage walls and the location of said openings differ for adjacent passage walls.

8. An electromagnetic water treatment apparatus according to claim 3, wherein said openings are formed at alternate ends of adjacent passage walls between said ends of said passage walls and the inner surface of said pipe line, and said openings are located, for adjacent passage walls, at alternate, opposite positions relative to the longitudinal axial direction of said pipe line.

9. An electromagnetic water treatment apparatus, comprising:
   a pair or pairs of electrodes facing water passages through a predetermined gap to apply electric fields to water flowing through said passages; and
   magnetic field generation means for applying a magnetic field to said water passing through said water passages, said magnetic field generation means located in a vicinity of at least one of a water outlet and a water inlet in an area where said electrodes are disposed along said water passages,
   wherein said electrodes are different in materials having different electrochemical potentials, and
   wherein said water passages, along which said electrodes are disposed, are provided in a pipe line, said water passages are defined by passage walls with openings for allowing free movement of water in such a manner that said water passages are positioned at predetermined intervals, perpendicularly staggered along a longitudinal axial direction of the pipe line, and said electrodes are arranged on facing surfaces of said passage walls and the location of said openings differ for adjacent passage walls.

10. An electromagnetic water treatment apparatus according to claim 9, wherein said openings are formed at alternate ends of adjacent passage walls between said ends of said passage walls and the inner surface of said pipe line, and said openings are located, for adjacent passage walls, at alternate, opposite positions relative to the longitudinal axial direction of said pipe line.

11. A liquid treatment apparatus comprising:
   a first pair of electrodes facing a first liquid passage through a first gap to apply an electric field to liquid flowing through said first liquid passage;
   a second pair of electrodes facing a second liquid passage through a second gap to apply an electric field to said liquid flowing through said second liquid passage;
   a magnetic field generator circuit that applies a magnetic field to said liquid passing through said first liquid passage and said second liquid passage,
   wherein a first direction in which said liquid passes through said first liquid passage is substantially different than a second direction in which said liquid passes through said second liquid passage.

12. The apparatus as claimed in claim 11, wherein said apparatus further comprises:
   a liquid inlet in which said liquid enters said apparatus; and
   a liquid outlet from which said liquid exits said apparatus,
   wherein said magnetic field generator circuit is located in a vicinity of at least one of said liquid outlet and said liquid inlet.

13. The apparatus as claimed in claim 11, wherein said first direction is substantially opposite to said second direction.

14. The apparatus as claimed in claim 11, wherein at least one of said first pair of electrodes and said second pair of electrodes is disposed at a non parallel angle to a flow of liquid entering said apparatus at a liquid inlet, and
   wherein said liquid enters said apparatus at said liquid inlet.

15. The apparatus as claimed in claim 11, wherein each of said first pair of electrodes and said second pair of electrodes is disposed at a non parallel angle to a flow of liquid entering said apparatus at a liquid inlet, and
   wherein said liquid enters said apparatus at said liquid inlet.

16. The apparatus as claimed in claim 11, wherein said liquid comprises water.

17. The apparatus as claimed in claim 11, wherein at least one of said first pair of electrodes and said second pair of electrodes is disposed substantially perpendicular to a flow of liquid entering said apparatus at a liquid inlet, and
   wherein said liquid enters said apparatus at said liquid inlet.

18. The apparatus as claimed in claim 11, wherein each of said first pair of electrodes and said second pair of electrodes is disposed substantially perpendicular to a flow of liquid entering said apparatus at a liquid inlet, and
   wherein said liquid enters said apparatus at said liquid inlet.

19. A liquid treatment apparatus comprising:
   a first pair of electrodes facing a first liquid passage through a first gap to apply an electric field to liquid flowing through said first liquid passage;
   a second pair of electrodes facing a second liquid passage through a second gap to apply an electric field to said liquid flowing through said second liquid passage;
   a magnetic field generator circuit that applies a magnetic field to said liquid passing through said first liquid passage and said second liquid passage; and
   a third liquid passage having a longitudinal axis, wherein said first liquid passage and said second liquid passage are disposed within said third liquid passage at a non parallel angle with respect to said longitudinal axis.

* * * * *